United States Patent
Jauhiainen et al.

(10) Patent No.: US 11,933,938 B2
(45) Date of Patent: Mar. 19, 2024

(54) SOLAR RADIATION CORRECTION IN RADIOSONDE TEMPERATURE MEASUREMENTS

(71) Applicant: Vaisala Oyj, Vantaa (FI)

(72) Inventors: Hannu Jauhiainen, Helsinki (FI); Petteri Survo, Helsinki (FI)

(73) Assignee: Vaisala Oyj, Vantaa (FI)

( * ) Notice: Subject to any disclaimer, the term of this patent is extended or adjusted under 35 U.S.C. 154(b) by 233 days.

(21) Appl. No.: 17/579,620

(22) Filed: Jan. 20, 2022

(65) Prior Publication Data

US 2022/0236450 A1   Jul. 28, 2022

(30) Foreign Application Priority Data

Jan. 28, 2021 (EP) .................................... 21154145

(51) Int. Cl.
| | | |
|---|---|---|
| *G01W 1/08* | (2006.01) | |
| *G01W 1/02* | (2006.01) | |
| *G01W 1/10* | (2006.01) | |
| *H02S 20/20* | (2014.01) | |
| *H02S 50/00* | (2014.01) | |

(52) U.S. Cl.
CPC ................. *G01W 1/08* (2013.01); *G01W 1/02* (2013.01); *G01W 1/10* (2013.01); *H02S 20/20* (2014.12); *H02S 50/00* (2013.01)

(58) Field of Classification Search
CPC ........... G01W 1/02; G01W 1/08; G01W 1/10; G01W 1/18; G01W 1/04; G01W 1/06; H02S 20/20; H02S 50/00; G01K 13/00; G01K 1/20; G01K 15/005; G01D 3/0365
See application file for complete search history.

(56) References Cited

U.S. PATENT DOCUMENTS

| | | | | |
|---|---|---|---|---|
| 5,954,430 A * | 9/1999 | Turtiainen | ............... | G01K 1/20 374/126 |
| 2010/0191496 A1* | 7/2010 | Von Bagh | ................ | G01K 1/20 702/99 |

FOREIGN PATENT DOCUMENTS

| | | |
|---|---|---|
| DE | 202013104586 U1 | 11/2013 |
| EP | 0783097 A1 | 7/1997 |
| EP | 1510800 A1 | 3/2005 |
| JP | H0516644 A | 1/1993 |
| KR | 101975545 B1 | 6/2019 |
| WO | WO2008155450 A1 | 12/2008 |

* cited by examiner

*Primary Examiner* — Franklin D Balseca
(74) *Attorney, Agent, or Firm* — Laine IP Oy (57) ABSTRACT

According to an example aspect of the present invention, there is provided a system for solar radiation correction in radiosonde temperature measurements, the system comprising a radiosonde having a temperature sensor configured to determine a temperature of the atmosphere at different altitudes, at least one light sensing assembly comprising a light sensor, and a light collector configured to collect light from different solar radiation angles at the different altitudes, and the system further comprising control electronics or a computing device configured to calculate for each altitude a solar radiation correction based on the signal received by the light sensor in order to obtain a corrected temperature reading for each altitude.

15 Claims, 6 Drawing Sheets

SOLAR RADIATION CORRECTION IN RADIOSONDE TEMPERATURE MEASUREMENTS

FIELD

The present invention relates to a system for solar radiation correction in radiosonde temperature measurements.

Further, the present invention relates to a method for solar radiation correction in radiosonde temperature measurements.

Furthermore, the present invention relates to a use of a system in order to obtain a corrected temperature reading of the atmosphere at different altitudes.

Additionally, the present invention relates to a non-transitory computer readable medium.

BACKGROUND

A radiosonde is a weather observation device, which is attached to a gas balloon, measures atmospheric parameters, and sends the measurement information typically to a ground station. Measured or calculated parameters typically include ambient temperature, pressure, and humidity, as well as wind speed and wind direction, at various altitudes.

The radiosonde is carried upwards through the atmosphere by a gas balloon, whereby the atmosphere to be measured and also the environmental conditions of the measurement arrangement change dynamically. Certain embodiments of the invention are also suitable for dropsondes. A dropsonde is a weather observation device like a radiosonde, but instead of being lifted by a gas balloon it is dropped from an airborne system, typically an aircraft, Unmanned Aircraft System (UAS), or a driftballoon.

Meteorological measurements are performed by the sensors of the radiosonde. The atmospheric profile obtained by a radiosonde is particularly important as input for numerical weather forecasting models and climate research. There are also military radiosonde applications e.g. for weather forecasting and ballistic preparation.

Document DE 202013104586 U1, for example, describes a radiosonde comprising a measurement boom including at least one sensor. The radiosonde further comprises an additional arm to which a balloon can be coupled. The measurement boom is capable of being inclined at an angle relative to said arm.

All radiosonde temperature sensors are prone to solar radiation error. If the sensitivity pattern of a temperature sensor for received solar radiation is not fully omnidirectional, the solar radiation error is angle dependent.

For example, the shape of the radiosonde temperature sensor may be a relatively long rod having a square cross section. When radiation from the sun arrives parallel to the longitudinal sensor axis, the heating effect is at minimum. When radiation from the sun arrives at the side corner between two sides of the temperature sensor. In other words, the radiation error is dependent on the solar radiation angle and the sensor boom angle.

Document KR 101975545 B1 discloses a radiosonde. The radiosonde is provided adjacent to a temperature sensor so as to have an incident amount of light corresponding to the incident amount of light to the temperature sensor, and comprises: a solar panel for generating a voltage with the incident light, a control part for correcting the temperature measurement information on the basis of the voltage measurement information received from the solar panel, and a main body provided with a communication part. The main body part includes an inner case and an outer container accommodating the inner case, and an insulating coating layer is formed on the outer surface of the outer container. KR 101975545 B1 describes a method for measuring light intensity by solar cells and use of data for temperature sensor solar radiation correction.

However, the radiosonde described in KR 101975545 B1 does not teach how to provide an accurate radiosonde orientation free solar radiation correction, as the two presented planar sensor arrangements have clear maximum and minimum radiation angles for incoming light measurement.

In view of the foregoing, it would be beneficial to provide an improved system and method for solar radiation correction in radiosonde temperature measurements.

SUMMARY OF THE INVENTION

The invention is defined by the features of the independent claims. Some specific embodiments are defined in the dependent claims.

According to a first aspect of the present invention, there is provided a system for solar radiation correction in radiosonde temperature measurements, the system comprising a radiosonde having a temperature sensor configured to determine a temperature of the atmosphere at different altitudes, at least one light sensing assembly comprising a light sensor, and a light collector configured to collect light from different solar radiation angles at the different altitudes, and the system further comprising control electronics or a computing device configured to calculate for each altitude a solar radiation correction based on the signal received by the light sensor in order to obtain a corrected temperature reading for each altitude.

Various embodiments of the first aspect may comprise at least one feature from the following bulleted list:

- the light collector is configured to collect light from different solar radiation angles proportional to solar radiation that is at the same time received by the temperature sensor
- the at least one light sensing assembly has an identic sensitivity pattern for incoming solar radiation as the temperature sensor has for incoming visible solar radiation
- the temperature sensor has a square cross sectional area, a polygonal cross sectional area or is in the form of a sphere or an ellipsoid
- the at least one light sensing assembly is arranged outside of a housing of the radiosonde
- the light sensing assembly is comprised by a measurement boom of the radiosonde
- the at least one light sensing assembly further comprises a light guide configured to guide light from the light collector to the light sensor
- the light guide comprises an optical fiber configured to guide the collected light to the light sensor
- the light sensor is arranged inside of the housing of the radiosonde and the light collector is arranged outside of the housing of the radiosonde
- the light sensor is a flat sensor such as a light transistor or a light diode
- the system comprises two or more light sensing assemblies
- the system comprises a ground station
- the radiosonde comprises a transmitter for wirelessly transmitting light sensor data and determined temperature data of the atmosphere at different altitudes to the ground station the ground station comprises a receiver for wirelessly receiving light sensor data and determined temperature data of the atmosphere at different altitudes from the radiosonde the computing device comprises a transmitter for wirelessly transmitting data to a cloud based server According to a second aspect of the present invention, there is provided a method for solar radiation correction in radiosonde temperature measurements, the method comprising determining a temperature of the atmosphere at different altitudes by a radiosonde having a temperature sensor, collecting by a light collector light from different solar radiation angles at the different altitudes, and calculating by control electronics or a computing device for each altitude a solar radiation correction based on the signal received by the light sensor in order to obtain a corrected temperature reading for each altitude.

Various embodiments of the second aspect may comprise at least one feature from the following bulleted list:

the method further comprising collecting by the light collector light from different solar radiation angles proportional to solar radiation that is at the same time received by the temperature sensor the method yet further comprising arranging the light collector and the light sensor outside of a housing of the radiosonde attaching the light collector and the light sensor to a measurement boom of the radiosonde the method yet further comprising arranging the light sensor inside of the housing of the radiosonde and arranging the light collector outside of the housing of the radiosonde and guiding the collected light from the light collector to the light sensor via a light guide the method even further comprising guiding the collected light to the light sensor by an optical fiber According to a third aspect of the present invention, there is provided a use of a system according to any one of claims 1-9 in order to obtain a corrected temperature reading of the atmosphere at different altitudes.

According to a fourth aspect of the present invention, there is provided a non-transitory computer readable medium having stored thereon a set of computer implementable instructions capable of causing a processor, in connection with the system according to any one of claims 1-9, to receive from the light sensor a signal, and calculate a solar radiation correction based on the signal received by the light sensor in order to obtain a corrected temperature reading.

Considerable advantages are obtained by means of certain embodiments of the present invention. A system and method for solar radiation correction in radiosonde temperature measurements are provided. The light collector is configured to collect light from different solar radiation angles at the different altitudes. Light from different solar radiation angles is collected proportional to solar radiation that is at the same time received by the temperature sensor. For each altitude a solar radiation correction is then calculated based on the signal received by the light sensor in order to obtain a corrected temperature reading for each altitude. Thus, the present invention takes into account the solar radiation angle and accurate radiosonde orientation free solar radiation correction is provided.

According to a certain embodiment, the light sensor and the light collector are arranged outside of the housing in order to provide a simple and compact light sensing assembly. According to a certain embodiment, two or more of such light sensing assemblies are provided outside of the housing, for example on opposite sides of the housing. According to another certain embodiment, the light sensor, for example a silicon photodetector, can be arranged within the housing of the radiosonde, i.e. in a temperature controlled environment. The light collected by the light collector is then guided via a light guide to the light sensor. Thus, the temperature dependency of silicon photodetectors does not have to be taken into account or provides at least a limited effect.

In addition to temperature reading correction, the setup provides measurement data for total radiation at visible wave length. The data can be utilized, for example, for research or numerical weather prediction (NWP) model purposes.

EMBODIMENTS

Figure 1:
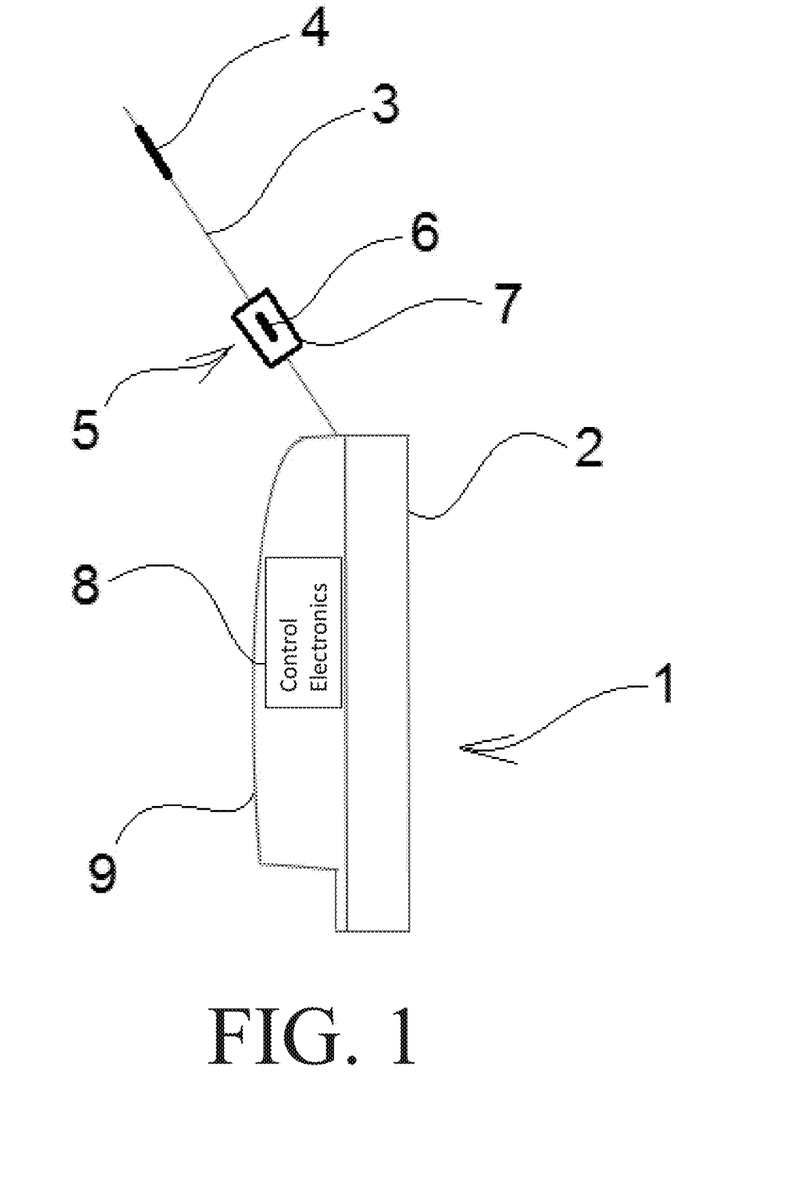
FIG. 1 illustrates a schematic view of a system in accordance with at least some embodiments of the present invention.

In FIG. 1 a schematic view of a system 1 in accordance with at least some embodiments of the present invention is illustrated. The system 1 comprises a radiosonde 2 comprising a measurement boom 3. The measurement boom 3 is equipped with a temperature sensor 4. The temperature sensor 4 is configured to determine a temperature of the atmosphere at different altitudes. The temperature sensor may be, for example, in the form of a relatively long rod having a square cross section.

Additionally, the system 1 comprises a light sensing assembly 5. The light sensing assembly 5 is coupled to the measurement boom 3 outside of the housing 9 of the radiosonde 2. The light sensing assembly 5 comprises a light sensor 6 and a light collector 7. The light sensor 6 may be, for example, a planar silicon photodetector. The light collector 7 is configured to collect light from different solar radiation angles at different altitudes of the atmosphere. The solar radiation angles typically vary over time while the radiosonde rises up in the atmosphere. In particular, swinging of the radiosonde below the balloon results in varying solar radiation angles in relation to the surface of the temperature sensor 4. Consequently, the solar radiation angle can vary for different altitudes, i.e. the solar radiation angle is dependent on the altitude. For each altitude light can be collected from one solar radiation angle. The heating effect caused by the solar radiation is at maximum, when the solar radiation arrives at a side corner between two sides of temperature sensor 4. The heating effect is at minimum, when the solar radiation arrives parallel to the longitudinal axis of the temperature sensor 4. The light collector 7 is configured to collect light from different solar radiation angles proportional to solar radiation that is at the same time received by the temperature sensor 4.

The system 1 further comprises control electronics 8. The control electronics may, for example, comprise a microcontroller and a memory. The control electronics 8 are arranged within the housing 9 of the radiosonde 2. The control electronics 8 may be configured to calculate for each altitude a solar radiation correction based on the signal received by the light sensor 6 in order to obtain a corrected temperature reading for each altitude. In other words, the data obtained by the light sensor 6 is used for temperature sensor solar radiation correction. The corrected temperature reading may then be transmitted to a ground station, for instance. However, typically for each altitude a solar radiation correction is calculated by a computing device 14 comprised by the ground station 11 as described in connection with FIG. 2.

According to certain embodiments, two or more light sensing assemblies 5 are provided outside of the housing 9 of the radiosonde 2, for example on opposite sides of the radiosonde 2. Light sensing assemblies 5 may also be directly attached to the housing 9 of the radiosonde 2.

According to certain other embodiments, the temperature sensor may also have any other shape, for example the sensor may be in the form of a sphere or an ellipsoid. The general principle of the present invention applies to all temperature sensor designs involving directional sensitivity to solar radiation. In addition to the sensor element, the directional sensitivity may also at least partly be dependent on the type of used mechanical support of the sensor.

Figure 2:
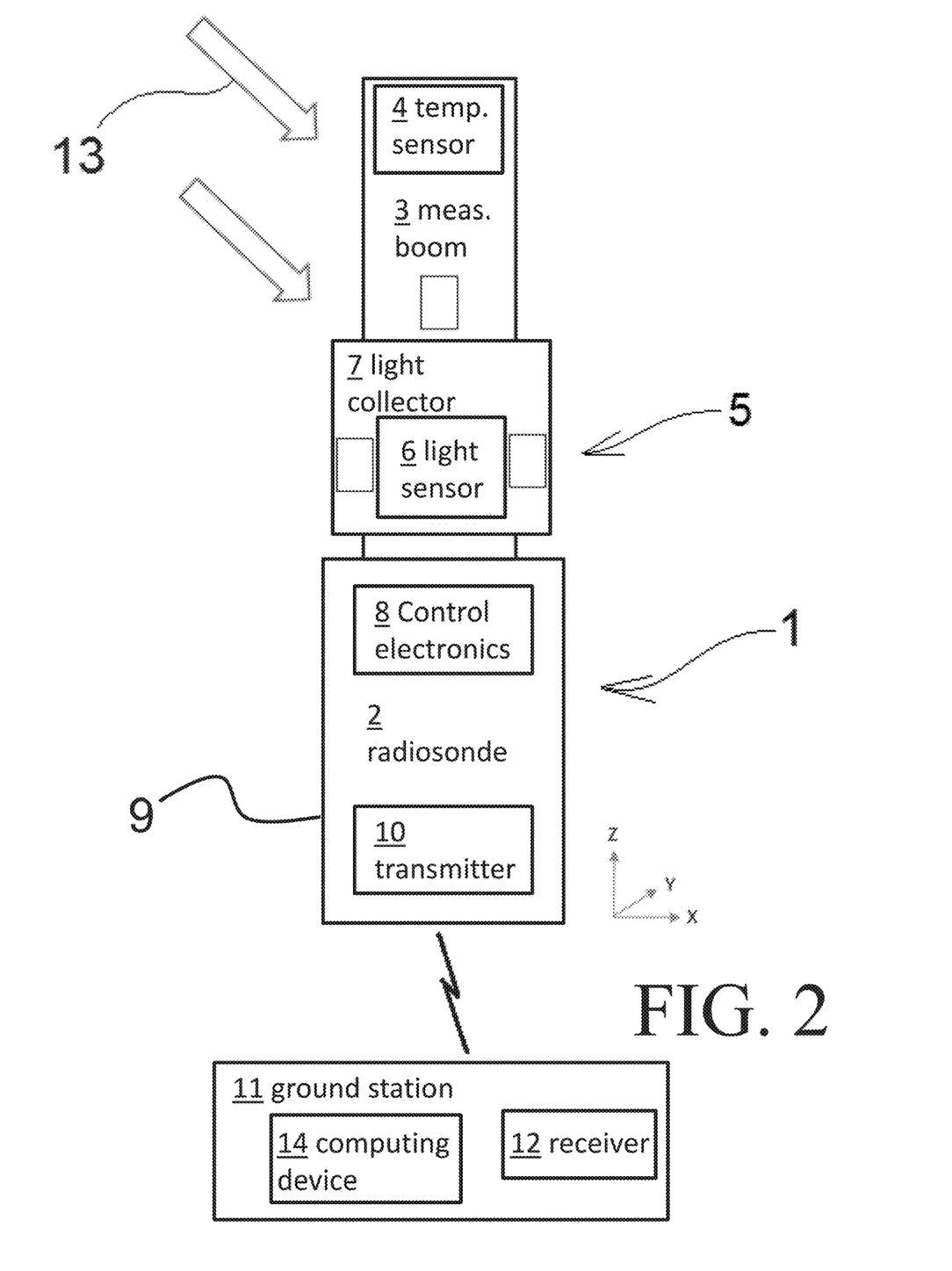
FIG. 2 illustrates a schematic view of another system in accordance with at least some embodiments of the present invention.

In FIG. 2 a schematic view of another system 1 in accordance with at least some embodiments of the present invention is illustrated. The shown system 1 operates as described above in connection with FIG. 1. Additionally, the radiosonde 2 comprises a transmitter 10 configured to wirelessly transmit light sensor data and determined temperature data of the atmosphere at different altitudes to a ground station 11. The ground station 11 comprises a receiver 12 configured to wirelessly receive light sensor data and determined temperature data of the atmosphere at different altitudes from the radiosonde 2. The ground station 11 comprises a computing device 14 configured to calculate for each altitude a solar radiation correction based on the signal received by the light sensor 6 in order to obtain a corrected temperature reading for each altitude.

Figure 3:
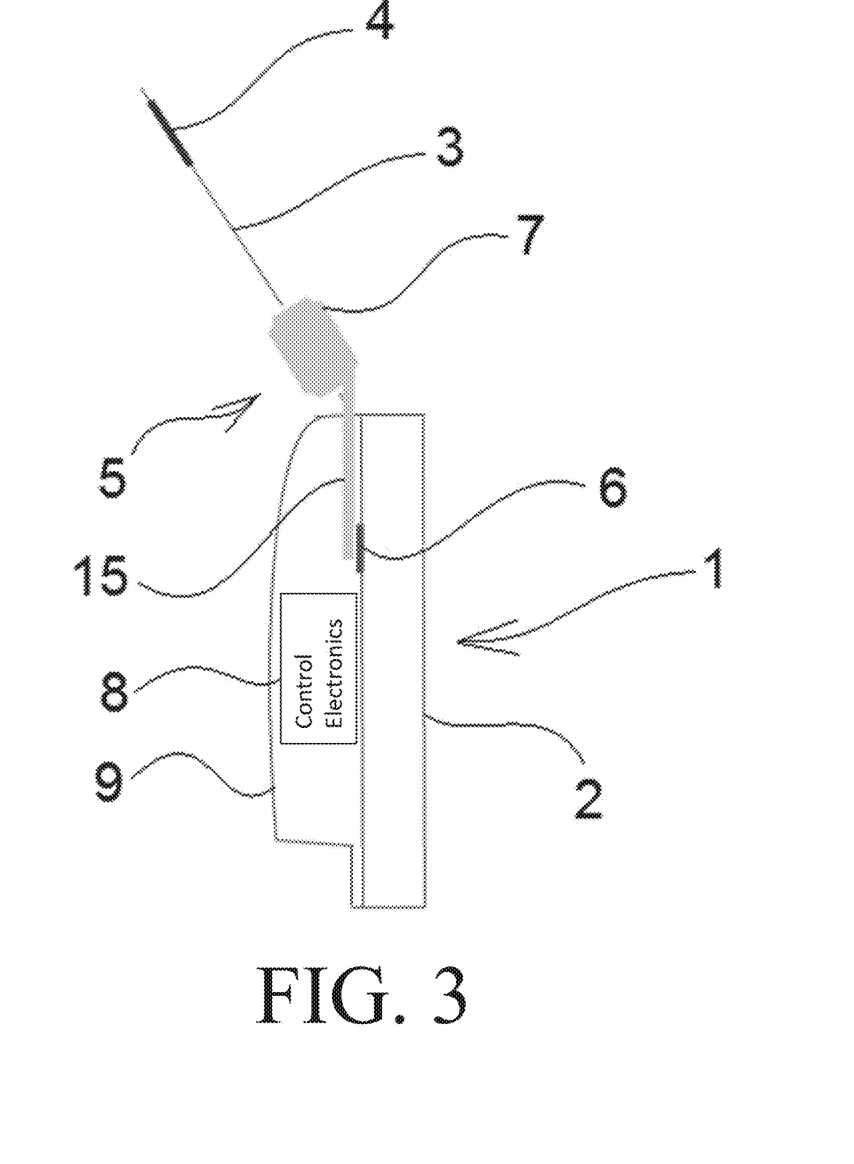
FIG. 3 illustrates a schematic view of a further system in accordance with at least some embodiments of the present invention.

In FIG. 3 a schematic view of a further system 1 in accordance with at least some embodiments of the present invention is illustrated. The system 1 comprises a radiosonde 2 comprising a measurement boom 3. The measurement boom 3 is equipped with a temperature sensor 4. The temperature sensor 4 is configured to determine a temperature of the atmosphere at different altitudes. The temperature sensor 4 may be, for example, in the form of a relatively long rod having a square cross section.

Additionally, the system 1 comprises a light sensing assembly 5. The light sensing assembly 5 comprises a light collector 7, a light sensor 6 and a light guide. The light guide is partially arranged outside of the housing 9 and partially arranged within the housing 9 of the radiosonde 2. The light sensor 6 may be, for example, a planar silicon photodetector. The light guide comprises an optical fiber 15, for instance. The light collector 7 is arranged outside of the housing 9 of the radiosonde 2 and the collected light can be guided via the optical fiber 15 to the light sensor 6 arranged within the housing 9 of the radiosonde. The light collector 7 may be attached to the measurement boom 4 or to another part of the radiosonde 2. The light collector 7 is configured to collect light from different solar radiation angles at different altitudes of the atmosphere. The solar radiation angles typically vary over time while the radiosonde rises up in the atmosphere. In particular, swinging of the radiosonde below the balloon results in varying solar radiation angles in relation to the surface of the temperature sensor 4. The heating effect caused by the solar radiation is at maximum, when the solar radiation arrives at a side corner between two sides of temperature sensor 4. The heating effect is at minimum, when the solar radiation arrives parallel to the longitudinal axis of the temperature sensor 4. The light collector 7 is configured to collect light from different solar radiation angles proportional to solar radiation that is at the same time received by the temperature sensor 4.

The system 1 further comprises control electronics 8. The control electronics may, for example, comprise a microcontroller and a memory. The control electronics 8 are arranged within the housing 9 of the radiosonde 2. The control electronics 8 may be configured to calculate for each altitude a solar radiation correction based on the signal received by the light sensor 6 in order to obtain a corrected temperature reading for each altitude. In other words, the data obtained by the light sensor 6 is used for temperature sensor solar radiation correction. The corrected temperature reading may then be transmitted to a ground station, for instance. However, typically for each altitude a solar radiation correction is calculated by a computing device 14 comprised by the ground station 11 as described in connection with FIG. 4.

Arrangement of the light sensor 6, for example a silicon photodetector, within the housing 9 of the radiosonde 2, i.e. in a temperature controlled environment, is beneficial as the temperature dependency of the light sensor 6 does not have to be taken into account or provides at least a limited effect.

According to certain embodiments, two or more light sensing assemblies 5 comprising a light sensor 6, a light collector 7 and a light guide are provided, for example on opposite sides of the radiosonde 2.

Figure 4:
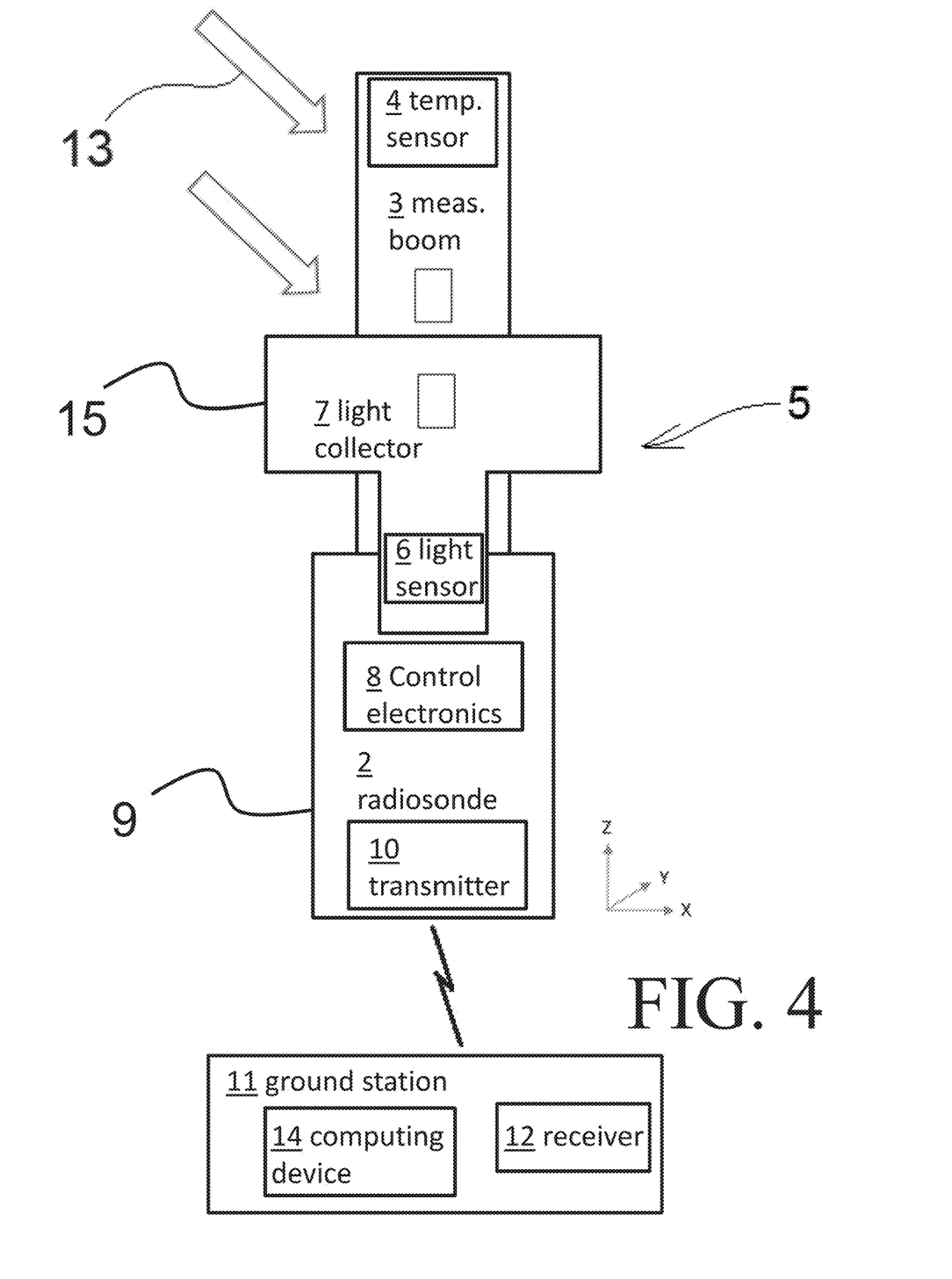
FIG. 4 illustrates a schematic view of an even further system in accordance with at least some embodiments of the present invention.

In FIG. 4 a schematic view of an even further system 1 in accordance with at least some embodiments of the present invention is illustrated. The shown system 1 operates as described above in connection with FIG. 3. Additionally, the radiosonde 2 comprises a transmitter 10 configured to wirelessly transmit light sensor data and determined temperature data of the atmosphere at different altitudes to a ground station 11. The ground station 11 comprises a receiver 12 configured to wirelessly receive light sensor data and determined temperature data of the atmosphere at different altitudes from the radiosonde 2. The ground station 11 comprises a computing device 14 configured to calculate for each altitude a solar radiation correction based on the signal received by the light sensor 6 in order to obtain a corrected temperature reading for each altitude.

Figure 5:
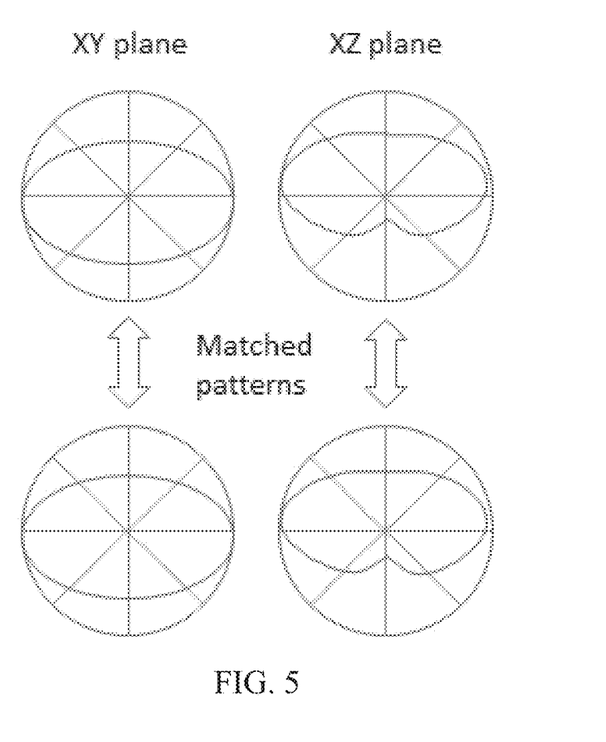
FIG. 5 illustrates radiation patterns of a system in accordance with at least some embodiments of the present invention.

In FIG. 5 radiation patterns of a system in accordance with at least some embodiments of the present invention are illustrated. The radiation pattern for the temperature sensor caused by incoming solar radiation matches with the radiation pattern for the visible radiation obtained with the help of the light sensing assembly 5 in both the XY plane and the XZ plane for each altitude. The directions X, Y, Z are defined as shown in FIGS. 2 and 4. As can be seen, the sensitivity pattern for incoming solar radiation (lower images) measured by the light sensor 6 is identical with the incoming solar radiation (upper images) for the temperature sensor 4. At another altitude, the radiation patterns may have changed, but, however, the sensitivity pattern for incoming solar radiation measured by the light sensor 6 is still identical with the incoming solar radiation for the temperature sensor 4.

The data obtained by the light sensor 6 is used for correcting the temperature reading for each altitude.

Figure 6:
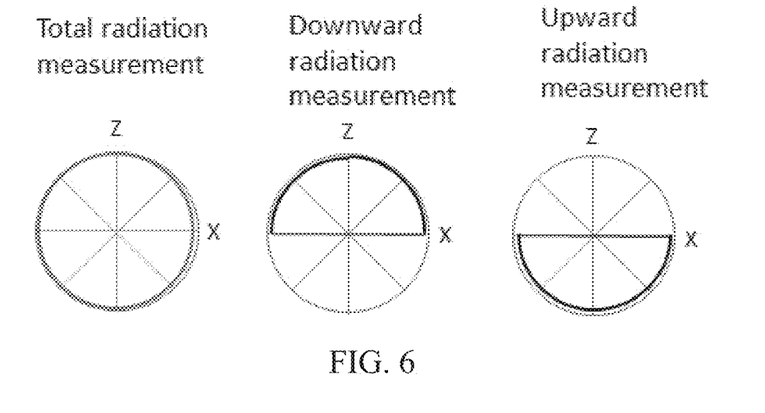
FIG. 6 illustrates an additional application of a system in accordance with at least some embodiments of the present invention.

In FIG. 6 an additional application of a system in accordance with at least some embodiments of the present invention is illustrated. The light sensing assembly 5 can be used for measuring the amount of downward and upward radiation.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in radiosondes, in particular in temperature measurements.

REFERENCE SIGNS LIST

1 system
2 radiosonde
3 measurement boom
4 temperature sensor
5 light sensing assembly
6 light sensor
7 light collector
8 control electronics
9 housing
10 transmitter
11 ground station
12 receiver
13 solar radiation
14 computing device
15 optical fiber

CITATION LIST

Patent Literature

DE 202013104586 U1
KR 101975545 B1
Non Patent Literature

The invention claimed is:

1. A system for solar radiation correction in radiosonde temperature measurements, the system comprising:
    a radiosonde having a temperature sensor configured to determine a temperature of the atmosphere at different altitudes,
    at least one light sensing assembly comprising
        a light sensor, and
        a light collector configured to collect light from different solar radiation angles at the different altitudes, and
    the system further comprising control electronics or a computing device configured to calculate for each altitude a solar radiation correction based on a signal received by the light sensor in order to obtain a corrected temperature reading for each altitude.

2. The system according to claim 1, wherein the collector is configured to collect light from different solar radiation angles proportional to solar radiation that is at the same time received by the temperature sensor.

3. The system according to any one of claim 1, wherein the temperature sensor has a square cross sectional area, a polygonal cross sectional area or is in a form of a sphere or an ellipsoid.

4. The system according to claim 1, wherein the temperature sensor has a square cross sectional area, a polygonal cross sectional area or is in the form of a sphere or an ellipsoid.

5. The system according to claim 1, wherein the at least one light sensing assembly is arranged outside of a housing of the radiosonde and/or the light sensing assembly is comprised by a measurement boom of the radiosonde.

6. The system according to claim 1, wherein the at least one light sensing assembly further comprises a light guide configured to guide light from the light collector to the light sensor.

7. The system according to claim 6, wherein the light guide comprises an optical fiber configured to guide the collected light to the light sensor.

8. The system according to claim 6, wherein the light sensor is arranged inside of a housing of the radiosonde and the light collector is arranged outside of the housing of the radiosonde.

9. The system according to claim 1, wherein the light sensor is a flat sensor such as a light transistor or a light diode.

10. A method for solar radiation correction in radiosonde temperature measurements, the method comprising:
    determining a temperature of the atmosphere at different altitudes by a radiosonde having a temperature sensor,
    collecting by a light collector light from different solar radiation angles at the different altitudes, and
    calculating by control electronics or a computing device for each altitude a solar radiation correction based on a signal received by a light sensor in order to obtain a corrected temperature reading for each altitude.

11. The method according to claim 10, the method further comprising collecting by the light collector light from different solar radiation angles proportional to solar radiation that is at the same time received by the temperature sensor.

12. The method according to claim 10, the method yet further comprising arranging the light collector and the light sensor outside of a housing of the radiosonde and/or attaching the light collector and the light sensor to a measurement boom of the radiosonde.

13. The method according to claim 10, the method further comprising guiding the collected light from the light collector arranged outside a housing of the radiosonde to the light sensor arranged inside of the housing of the radiosonde via a light guide.

14. Use of a system according to claim 1 in order to obtain a corrected temperature reading of the atmosphere at different altitudes.

15. A non-transitory computer readable medium having stored thereon a set of computer implementable instructions capable of causing a processor, in connection with the system according to claim 1, to:
    receive from the light sensor the signal, and
    calculate a solar radiation correction based on the signal received by the light sensor in order to obtain a corrected temperature reading.

* * * * *